United States Patent
Hodes et al.

(10) Patent No.: US 8,187,894 B2
(45) Date of Patent: May 29, 2012

(54) METHOD AND APPARATUS FOR CONTROLLING THE FLOW RESISTANCE OF A FLUID ON NANOSTRUCTURED OR MICROSTRUCTURED SURFACES

(75) Inventors: Marc Scott Hodes, New Providence, NJ (US); Paul Robert Kolodner, Hoboken, NJ (US); Timofei Nikita Kroupenkine, Warren, NJ (US); Alan Michael Lyons, New Providence, NJ (US); Mary Louise Mandich, Martinsville, NJ (US); Joseph Ashley Taylor, Springfield, NJ (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/301,964

(22) Filed: Nov. 22, 2011

(65) Prior Publication Data

US 2012/0060937 A1    Mar. 15, 2012

Related U.S. Application Data

(62) Division of application No. 10/674,448, filed on Sep. 30, 2003.

(51) Int. Cl.
*G01N 1/10* (2006.01)

(52) U.S. Cl. ........ 436/180; 422/500; 422/501; 244/200; 114/18; 114/312

(58) Field of Classification Search .......... 422/500–501; 436/180; 244/200; 114/18, 312
See application file for complete search history.

(56) References Cited

U.S. PATENT DOCUMENTS

| | | | |
|---|---|---|---|
| 4,728,591 A | 3/1988 | Clark et al. | |
| 4,750,693 A | 6/1988 | Lobert et al. | |
| 5,459,300 A | 10/1995 | Kasman | |
| 6,185,961 B1 | 2/2001 | Tonucci et al. | |
| 6,241,333 B1 | 6/2001 | Wen | |
| 6,603,444 B1 | 8/2003 | Kawanami et al. | |
| 7,005,593 B2 | 2/2006 | Gasparyan et al. | |

(Continued)

FOREIGN PATENT DOCUMENTS

| | | |
|---|---|---|
| DE | 19705910 C1 | 9/2003 |
| EP | 0290125 A2 | 3/1988 |
| WO | 03056330 A2 | 7/2003 |

(Continued)

OTHER PUBLICATIONS

Becker, E. W. et al., "Fabrication of Microstructures With High Aspect Ratios and Great Structural Heights by Synchrotron Radiation Lithography, Galvanoforming, and Plastic Moulding (LIGA Process)," Microelectronic Engineering, May 4, 1986, No. 1, pp. 35-56.

(Continued)

*Primary Examiner* — Jyoti Nagpaul
(74) *Attorney, Agent, or Firm* — Hitt Gaines, PC

(57) ABSTRACT

A method and apparatus is disclosed wherein the flow resistance of a droplet disposed on a nanostructured or microstructured surface is controlled. A closed-cell feature is used in a way such that, when the pressure of at least a first fluid within one or more of the cells of said surface is decreased to or below a desired level, a droplet disposed on that surface is caused to at least partially penetrate the surface. In another illustrative embodiment, the pressure within one or more of the cells is increased to or above a desired level in a way such that the droplet of liquid is returned at least partially to its original, unpenetrated position. In yet another embodiment, a closed-cell structure feature pattern is used to prevent penetration of the nanostructured or microstructured surface, even when the pressure of the fluid disposed on the surface is relatively high.

5 Claims, 12 Drawing Sheets

U.S. PATENT DOCUMENTS

| | | |
|---|---|---|
| 7,048,889 B2 | 5/2006 | Arney et al. |
| 7,156,032 B2 | 1/2007 | Kornblit et al. |
| 7,195,872 B2 | 3/2007 | Agrawal et al. |
| 7,227,235 B2 | 6/2007 | Kroupenkine et al. |
| 7,618,746 B2 | 11/2009 | Kroupenkine et al. |
| 7,749,646 B2 | 7/2010 | Hodes et al. |
| 7,785,733 B2 | 8/2010 | Hodes et al. |
| 2003/0148401 A1 | 8/2003 | Agrawal et al. |
| 2003/0179378 A1 | 9/2003 | Lafferty |
| 2004/0191127 A1 | 9/2004 | Kornblit et al. |
| 2005/0069458 A1 | 3/2005 | Hodes et al. |
| 2005/0203613 A1 | 9/2005 | Arney et al. |
| 2005/0211505 A1 | 9/2005 | Kroupenkine et al. |

FOREIGN PATENT DOCUMENTS

| | | |
|---|---|---|
| WO | 03056330 A3 | 7/2003 |
| WO | 03071335 A2 | 8/2003 |
| WO | 03071335 A3 | 8/2003 |
| WO | 03083447 A1 | 10/2003 |

OTHER PUBLICATIONS

Kim Joonwon, et al., "Nanostructured Surfaces for Dramatic reduction of Flow Resistance in Droplet-Based Microfluidics," IEEE, 2002, pp. 479-482.

Chinese Office Action, Dated Sep. 26, 2008, for related Chinese application No. 200410012073.9, 13 pages.

European Search Report, Dated Sep. 30, 2003, for the related EP application No. 04255627. 4 pages.

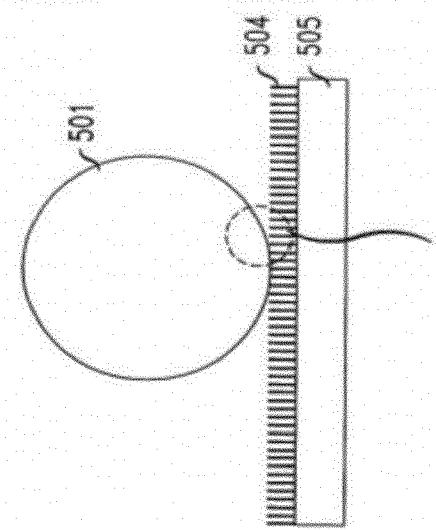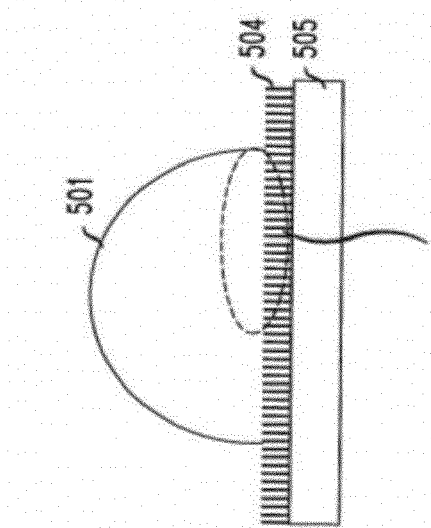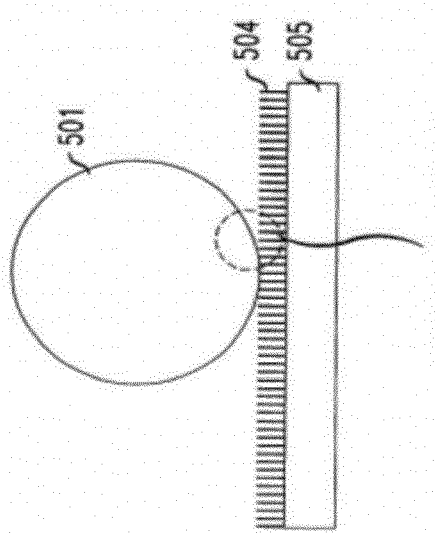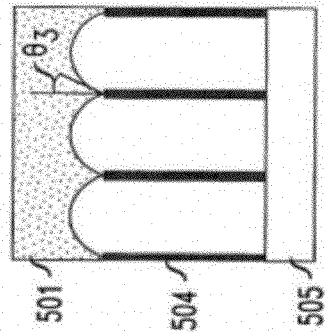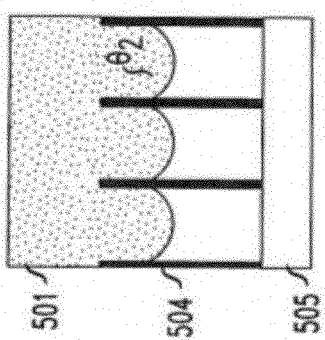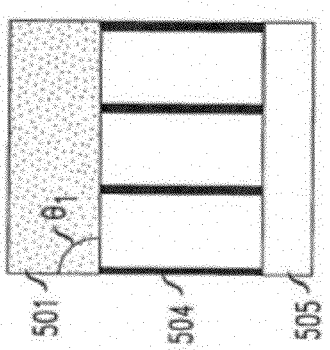
FIG. 5A  FIG. 5B  FIG. 5C

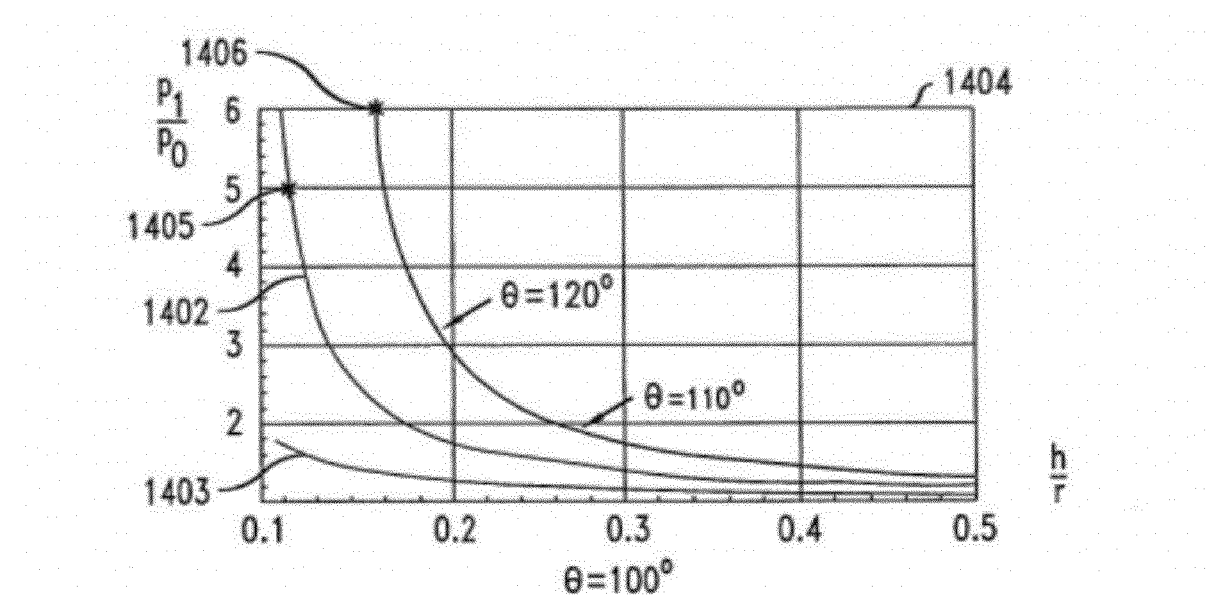

METHOD AND APPARATUS FOR CONTROLLING THE FLOW RESISTANCE OF A FLUID ON NANOSTRUCTURED OR MICROSTRUCTURED SURFACES

CROSS REFERENCE TO A RELATED APPLICATION

This Application is a Divisional of U.S. application Ser. No. 10/674,448 filed on Sep. 30, 2003, to Marc Hodes, et al., entitled "METHOD AND APPARATUS FOR CONTROLLING THE FLOW RESISTANCE OF A FLUID ON NANOSTRUCTURED OR MICROSTURCUTRED SURFACES," currently Allowed; commonly assigned with the present invention and incorporated herein by reference.

FIELD OF THE INVENTION

The present invention relates generally to the motion of liquids disposed on a surface with extremely small, predetermined surface features and, more particularly, to controlling flow resistance experienced by a liquid disposed on a surface with predetermined nanostructure or microstructure features.

BACKGROUND OF THE INVENTION

Many beneficial devices or structures in myriad applications are characterized at least in part by having a liquid that is in contact with at least one solid surface. Recent applications have focused on the movement of small droplets of liquid disposed on nanostructured or microstructured surfaces which can be manufactured by various methods, such as various means of lithography or etching. Such surfaces result in surfaces that are useful for significantly reducing flow resistance experienced by droplets of liquid disposed on the surfaces.

One such application is described in "Nanostructured Surfaces for Dramatic Reduction of Flow Resistance in Droplet-based Microfluidics", J. Kim and C. J. Kim, IEEE Conf. MEMS, Las Vegas, Nev., January 2002, pp. 479-482, which is hereby incorporated by reference herein in its entirety. That reference generally describes how, by using surfaces with predetermined nanostructure features, the flow resistance to the liquid in contact with the surface can be greatly reduced. The Kim reference teaches that, by finely patterning the surface in contact with the liquid, and using the aforementioned principle of liquid surface tension, it is possible to greatly reduce the area of contact between the surface and the liquid. It follows that the flow resistance to the liquid on the surface is correspondingly reduced. However, as exemplarily taught by the Kim reference, the flow resistance to the liquid is reduced to such a level that it was difficult or impossible to control the movement of the liquid. Thus, it was necessary to dispose the droplets in a narrow channel or other enclosure to control the freedom movement of the droplet to within a prescribed area.

In order to better control the movement of liquid droplets disposed on surfaces patterned with nanostructures or microstructures, more recent attempts have relied on characteristics of the droplet or, alternatively, intra-pattern characteristics of the nanostructures or the microstructures to control the lateral movement of liquid droplets. Such control is the subject of copending U.S. patent application Ser. No. 10/403,159, filed Mar. 31, 2003, entitled "Method And Apparatus For Variably Controlling The Movement Of A Liquid On A Nanostructured Surface" which is hereby incorporated by reference herein in its entirety. In one embodiment described in that application, the lateral movement of a liquid droplet is achieved by designing, illustratively, the size, shape, density, or electrical properties of the nanostructure or microstructure such that the contact angle of the leading edge of a droplet is made to be lower than the contact angle of the trailing edge of the droplet. The resulting force imbalance causes the droplet to move in the direction of the leading edge. In another embodiment, the droplet is caused to penetrate the feature pattern at a desired area such that it becomes substantially immobile. This penetration can be affected, for example, by changing the surface tension of the droplet, the temperature of either the droplet or the pattern or the voltage differential between the droplet and the feature pattern.

As described in the '159 application, one or both of the above embodiments may be useful in a variety of applications, such as, illustratively, a biological or micro-chemical detector, a chemical reactor, a patterning application, a tunable diffraction grating, a total internal reflection mirror, a microfluidic mixer, a microfluidic pump or a heat dissipation device.

Thus, the above-described prior efforts focused on either reducing flow resistance experienced by a droplet or controlling the movement of a droplet of water across a surface. In another recent attempt, nanostructures or microstructures are used to reduce the flow resistance experienced by a body moving through a fluid. That attempt is described in copending U.S. patent application Ser. No. 10/649,285, entitled "Method And Apparatus For Reducing Friction Between A Fluid And A Body," filed Aug. 27, 2003 and is hereby incorporated by reference herein in its entirety. According to the embodiments of the invention disclosed in the '285 application, at least a portion of the surface of a vehicle moving through a fluid is patterned with nanostructures or microstructures. Thus, according to the principles discussed above, the flow resistance across the patterned surface is reduced. Also as discussed above, by causing the fluid to penetrate the patterned surface, flow resistance across the patterned surface can be increased.

SUMMARY OF THE INVENTION

While prior attempts to reduce the flow resistance of a fluid in contact with a surface are advantageous in many regards, we have realized that it would be extremely advantageous to be able to control the degree of penetration of a fluid disposed on a nanostructured or microstructured surface. Therefore, we have invented a method and apparatus wherein, in a first illustrative embodiment, a closed-cell nanostructured or microstructured surface is used in a way such that, when the pressure of at least a first fluid within one or more of the cells of said surface is decreased to or below a desired level, a droplet disposed on that surface is caused to at least partially penetrate the surface. In another illustrative embodiment, the pressure within one or more of the cells is increased to or above a desired level in a way such that the droplet of liquid is returned at least partially to its original, unpenetrated position. In this way, the penetration of the droplet into the surface can be varied to achieve a desired level of flow resistance experienced by the droplet of liquid.

In yet another embodiment, a closed-cell structure feature pattern is used to prevent penetration of the nanostructured or microstructured surface, even when the pressure of the fluid disposed on the surface is relatively high.

BRIEF DESCRIPTION OF THE DRAWING

FIGS. 5A, 5B and 5C show a device in accordance with the principles of the present invention wherein a droplet is disposed in an initial position suspended on top of a nanostructured feature pattern (FIG. 5A), is caused to penetrate the feature pattern (FIG. 5B), and is then caused to return to a position suspended on top of the feature pattern (FIG. 5C);

FIG. 14 shows a graph of pressure versus cell dimensions for the embodiment of FIGS. 11A and 11B.

DETAILED DESCRIPTION

As described above, microstructures and nanostructures have been used recently to reduce the flow resistance of experienced by a liquid as it moves across a surface. Such prior micro- or nanostructures can take many forms. For example, FIGS. 1A-1E show different illustrative prior art arrangements of nanoposts produced using various methods and further show that such various diameter nanoposts can be fashioned with different degrees of regularity. These figures show that it is possible to produce nanoposts having various diameters separated by various distances. An illustrative method of producing nanoposts, found in U.S. Pat. No. 6,185, 961, titled "Nanopost arrays and process for making same," issued Feb. 13, 2001 to Tonucci, et al, is hereby incorporated by reference herein in its entirety. Nanoposts have been manufactured by various methods, such as by using a template to form the posts, by various means of lithography, and by various methods of etching. As used herein, unless otherwise specified, the terms nanostructures/nanoposts and microstructures/microposts are used interchangeably.

Throughout the description herein, one skilled in the art will recognize that the same principles applied to the use of nanoposts or nanostructures can be equally applied to microposts or other larger features in a feature pattern.

Figure 1A:
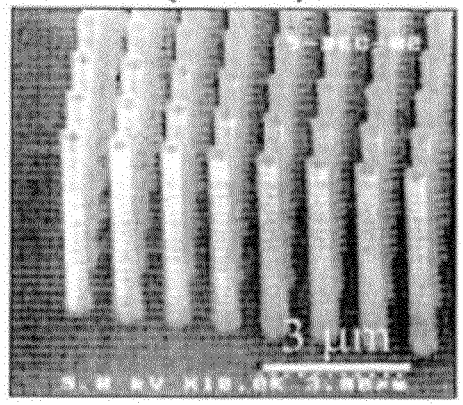
FIGS. 1A, 1B, 1C, 1D and 1E show various prior art nanostructure feature patterns of predefined nanostructures that are suitable for use in the present invention.
Figure 1B:
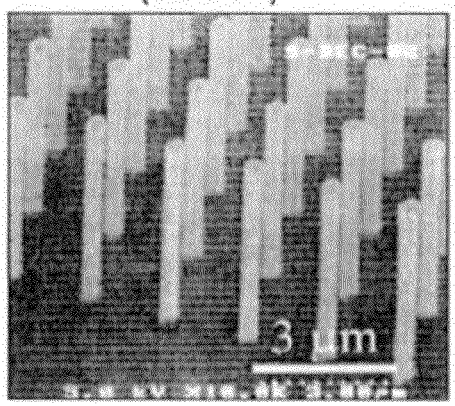
Figure 1C:
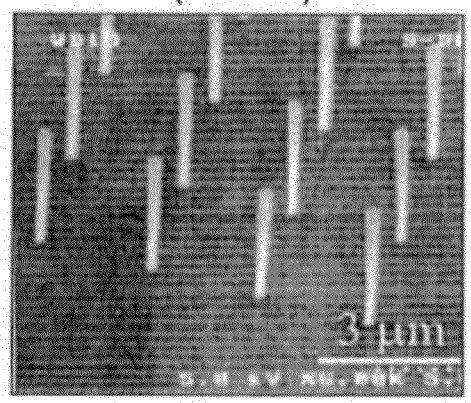
Figure 1D:
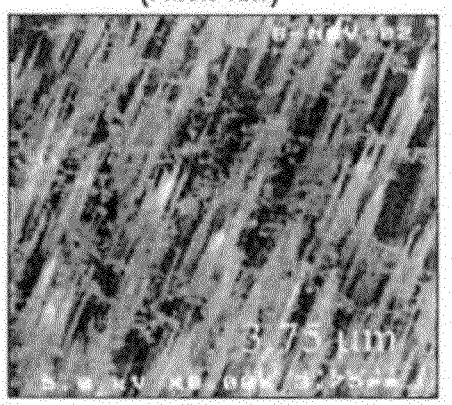
Figure 1E:
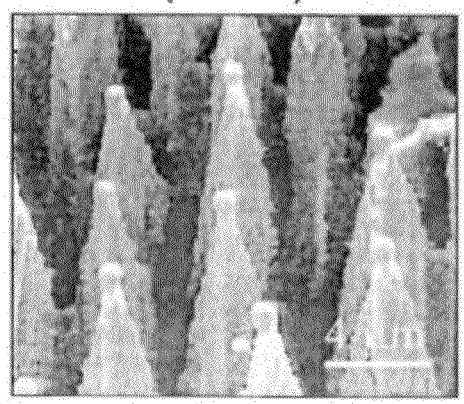
Figure 2:
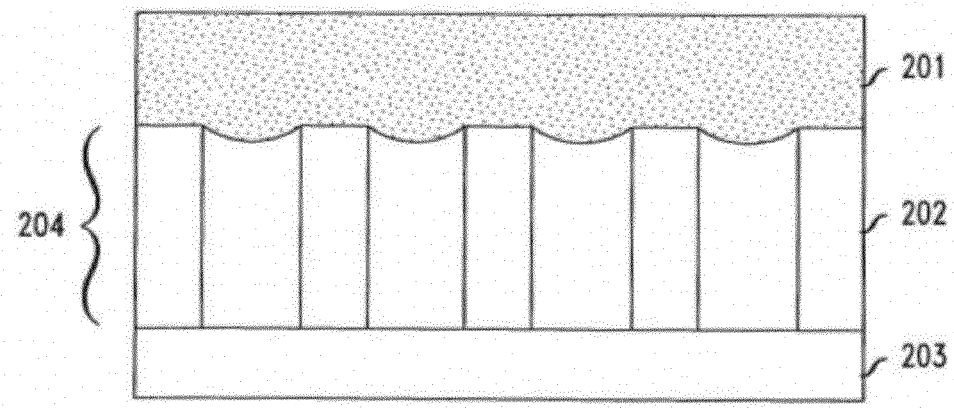
FIG. 2 shows an illustrative prior art device wherein a liquid droplet is disposed on a nanostructured or microstructured feature pattern

As is noted by the Kim reference described hereinabove, prior attempts at placing a droplet on surfaces having nanostructures or microstructures were problematic, as the extremely low flow resistance experienced by the droplet made it almost impossible to keep the water droplets stationary on the respective surface. As shown in FIG. 2, the reason for this low flow resistance is that the surface tension of droplet 201 of an appropriate liquid (depending upon the surface structure) will enable the droplet 201 to be suspended on the tops of the nanostructure feature pattern 202 with no contact between the droplet and the underlying solid surface 203. While nanostructures 202 are illustratively cylindrical posts in FIG. 2, one skilled in the art will realize that many suitable geometric shapes, such as conical posts, may be equally advantageous. As illustratively shown in FIG. 2, suspending the droplet on top of the nanostructures results in an extremely low area of contact between the droplet and the nanostructured surface 204 (i.e., the droplet only is in contact with the top of each post 202) and, hence low flow resistance.

Figure 3A:
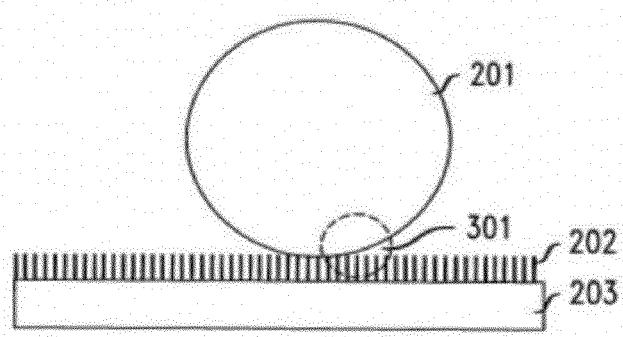
FIG. 3A shows the droplet of liquid of FIG. 2A suspended on the nanostructured feature pattern of FIG. 3.
Figure 3B:
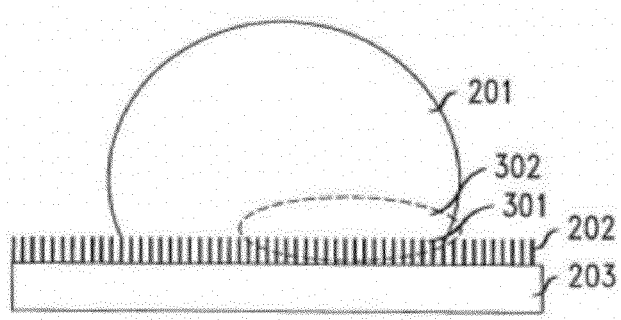
FIG. 3B shows the droplet of liquid of FIG. 4A when it is caused to penetrate the nanostructured feature pattern of FIG. 3.

FIG. 3A shows a macro view of the droplet 201 of FIG. 2 when it is suspended on top of the nanostructure feature pattern 202. As in FIG. 2, the droplet in FIG. 3A does not penetrate the feature pattern 202 and, accordingly, experiences a low flow resistance. FIG. 3B, however, shows illustrative droplet 201 in a configuration in which it does penetrate feature pattern 202. When the droplet 201 penetrates the feature pattern 202, the droplet becomes relatively immobile, i.e., it experiences a relatively high degree of flow resistance. In general, a liquid droplet will penetrate a feature pattern, for example, when the surface tension of the liquid droplet is sufficiently low. Therefore, depending upon the characteristics of the feature pattern 202, one skilled in the art will be able to select a liquid for droplet 201 with an appropriate surface tension to facilitate such penetration of the pattern 202. Alternatively, as described in copending U.S. patent application Ser. No. 10/403,159, discussed and incorporated by reference hereinabove, various methods can be used to reduce the surface tension of the droplet 201 that is suspended on top of the feature pattern, as is illustrated in FIG. 3A.

Figure 4A:
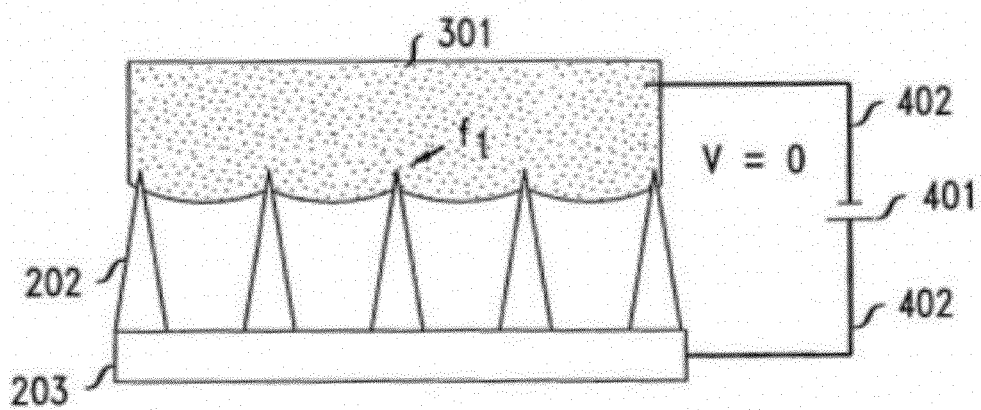
FIGS. 4A and 4B show an illustrative prior art device whereby the electrowetting principles are used to cause a liquid droplet to penetrate a nanostructure feature pattern.
Figure 4B:
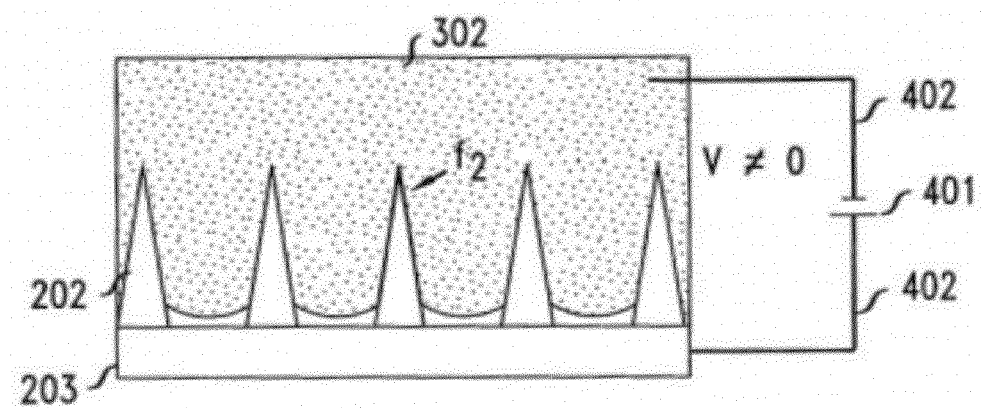

FIGS. 4A and 4B show such a prior art embodiment of one method useful to cause the droplet 201 to penetrate a nanostructure feature pattern. FIG. 4A illustrates, for example, the area 301 in FIG. 3 of droplet 201 in contact with feature pattern 202. Referring to FIG. 4A, droplet 201 is illustratively a conducting liquid and is disposed on nanostructure feature pattern 202 of conical nanoposts. As described above and illustrated in FIG. 3A, the surface tension of the droplet 201 is such that the droplet 201 is suspended on the upper portion of the feature pattern 202. In this arrangement, the droplet 201 only covers surface area $f_1$ of each nanopost. The nanoposts of feature pattern 202 are supported by the surface of a conducting substrate 203. Droplet 201 is held illustratively at an electrical potential difference with respect to substrate 203, applied by voltage source 401 through lead 402.

FIG. 4B shows that, by applying a low voltage (e.g., 10-20 volts) to the conducting droplet of liquid 201, a voltage difference results between the liquid 201 and the nanoposts of feature pattern 202. As a result, the contact angle of droplet 201 decreases and droplet 201 moves down in the y-direction along the surface of the nanoposts and penetrates the nanostructure feature pattern 202 until it completely surrounds each of the nanoposts and comes into contact with the upper surface of substrate 203. In this configuration, the droplet covers surface area $f_2$ of each nanopost. Since $f_2 >> f_1$ the overall contact area between the droplet 201 and the nanoposts of feature pattern 202 is relatively high and, accordingly, the flow resistance experienced by the droplet 201 is greater than in the embodiment of FIG. 4A. Thus, as shown in FIG. 4B, the droplet 201 effectively becomes stationary relative to the nanostructure feature pattern in the absence of another force sufficient to dislodge the droplet 201 from the feature pattern 202.

The present inventors have recognized that it would be desirable to be able to selectively cause a droplet of liquid to penetrate a feature pattern and, then, to be able to selectively reverse this penetration. FIGS. 5A, 5B and 5C illustrate such a selective/reversible penetration of droplet 501 into pattern 504. FIG. 5A shows an illustrative droplet 501 disposed on a nanostructure or microstructure feature pattern 504 that is supported by substrate 505. The angle of contact between the droplet and the feature pattern is shown as $\theta_1$. Next, as shown in FIG. 5B and discussed above, droplet 501 is caused to penetrate the feature pattern 504. The angle of contact between the droplet and the feature pattern increases in this case to $\theta_2$ as the droplet moves down along the individual elements (e.g., nanoposts) toward substrate 505. Finally, as shown in FIG. 5C, it is desirable to reverse the penetration of droplet 502 into the pattern 504. In this case the contact angle between the droplet and the feature pattern is as low or lower than $\theta_1$. Here, illustratively, the contact angle between the droplet 501 and the feature pattern 504 is shown as $\theta_3$, which is illustratively a smaller angle than $\theta_1$.

Figure 6A:
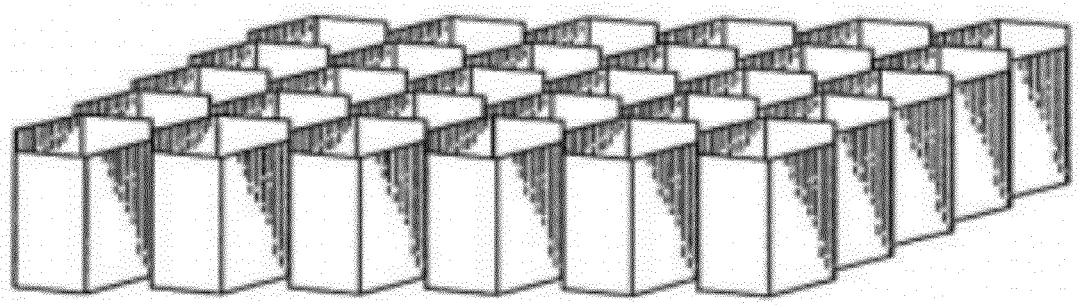
FIGS. 6A and 6B show an illustrative closed-cell structure in accordance with the principles of the present invention.
Figure 6B:
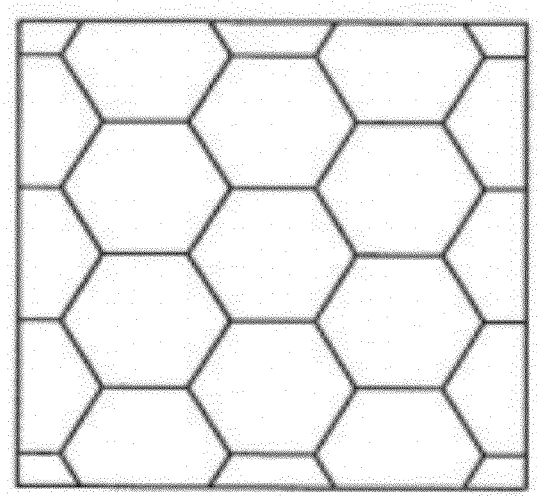
Figure 7A:
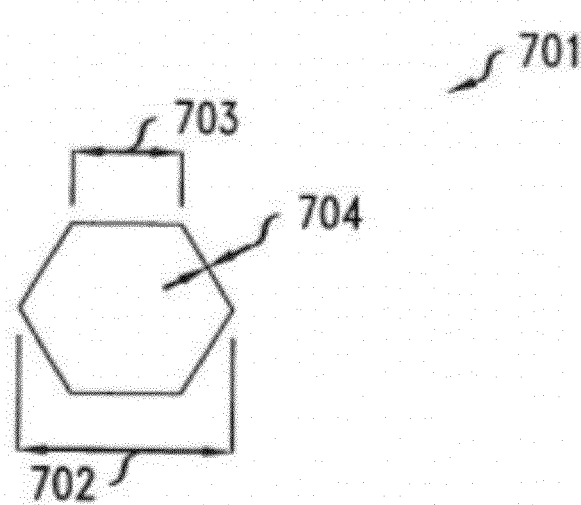
FIGS. 7A and 7B show the detail of one cell in the illustrative structure of FIGS. 6A and 6B.
Figure 7B:
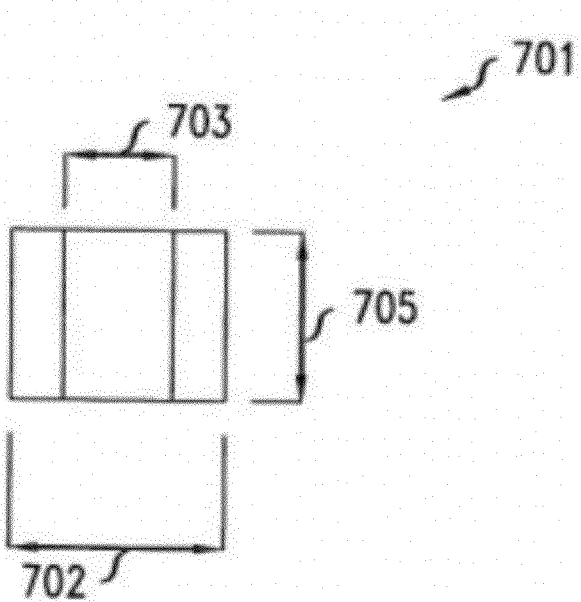

FIGS. 6A and 6B show, respectively, a three-dimensional view and a top cross-sectional view of an illustrative feature pattern in accordance with the principles of the present invention that is capable of accomplishing the reversible penetration shown in FIGS. 5A-5C. Specifically, in the present illustrative embodiment represented by FIGS. 6A and 6B, the feature pattern does not comprise a number of posts spaced a distance away from each other. Instead, a number of closed cells, here illustrative cells of a hexagonal cross section, are used. As used herein, the term closed cell is defined as a cell that is enclosed on all sides except for the side upon which a liquid is or could be disposed. One skilled in the art will recognize that other, equally advantageous cell configurations and geometries are possible to achieve equally effective closed-cell arrangements. FIGS. 7A and 7B show a top cross-sectional view and a side view of an illustrative individual cell of the feature pattern of FIGS. 6A and 6B. Specifically, referring to FIG. 7A, each individual cell 701 is characterized by a maximum width 702 of width d, an individual side length 703 of length d/2 and a wall thickness 704 of thickness t. Referring to FIG. 7B, the height 705 of cell 701 is height h.

Figure 8A:
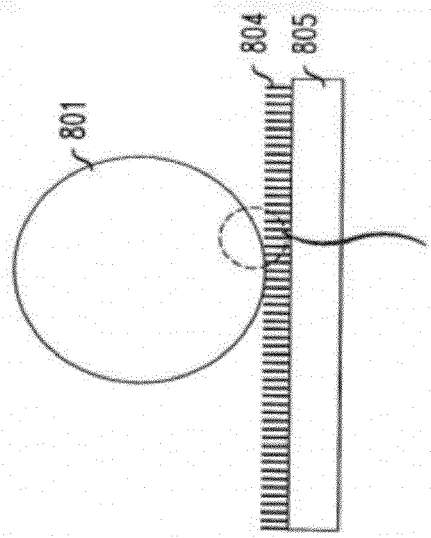
FIGS. 8A, 8B and 8C show a device in accordance with the principles of the present invention wherein a droplet is disposed in an initial position suspended on top of a nanostructured feature pattern (FIG. 8A), is caused to penetrate the feature pattern (FIG. 8B), and is then caused to return to a position suspended on top of the feature pattern (FIG. 8C)
Figure 8A:
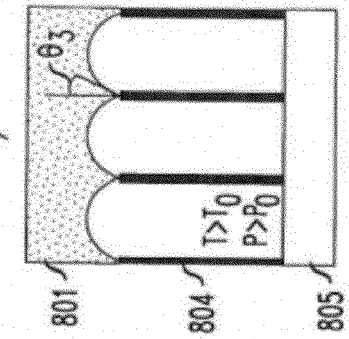
Figure 8B:
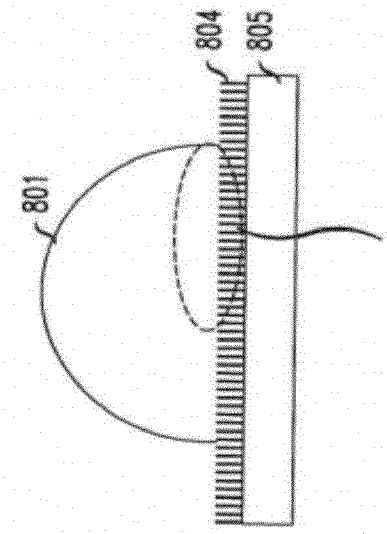
Figure 8B:
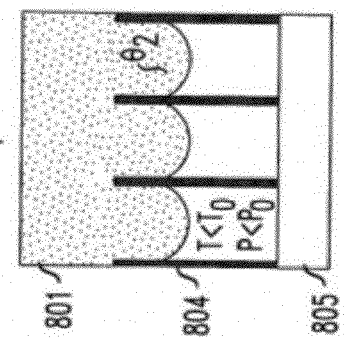
Figure 8C:
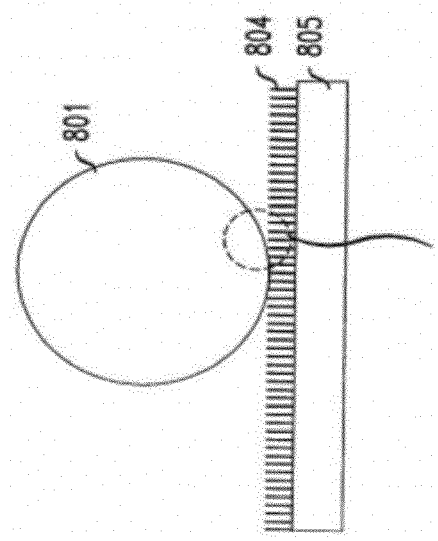
Figure 8C:
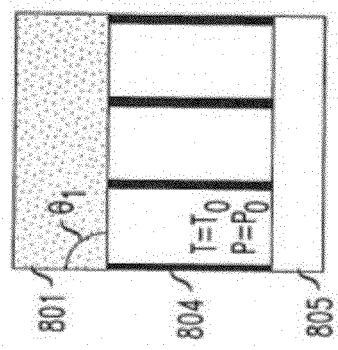

FIGS. 8A, 8B and 8C show how an illustrative closed-cell feature pattern similar to the feature pattern of FIGS. 6A and 6B, here shown in cross-section, may be used illustratively to cause a droplet 801 of liquid to reversibly penetrate the feature pattern. Specifically, each cell within feature pattern 804, such as cell 701 having a hexagonal cross-section, is a completely closed cell once the droplet of liquid covers the opening of that cell. Thus, referring to FIG. 8A, each such closed cell over which the droplet is disposed contains a fluid having an initial temperature $T=T_0$ and an initial pressure $P=P_0$. As used herein, the term fluid is intended to encompass both gases (such as, illustratively, air) and liquids that could be disposed within the cells of the feature pattern. The present inventors have recognized that, by changing the pressure within the individual cells, such as cell 701, the liquid droplet 801 can be either drawn into the cells or, alternatively, repelled out of the cell. Specifically, referring to FIG. 8B, if the pressure within the cell 701 is caused to be below the initial pressure (i.e., $P<P_0$), then the contact angle of the droplet with the feature pattern will increase from $\theta_1$ to $\theta_2$ and the droplet above that cell will be drawn into the cell a distance related to the magnitude in reduction of the pressure P. Such a reduction in pressure may be achieved, illustratively, by reducing the temperature of the fluid within the cells such that $T<T_0$. Such a temperature reduction may be achieved, illustratively, by reducing the temperature of the substrate 805 and/or the feature pattern 804. In this illustrative example, the temperature of the fluid may be reduced by well-known conduction/convection principles and, accordingly, the pressure within the cell will drop. One skilled in the art will recognize that any method of reducing the pressure within the cells, including any other method of reducing the temperature of the fluid within the cells, will have similar results.

FIG. 8C shows how, by increasing the pressure to or above the initial pressure $P_0$, it is possible to reverse the penetration of the droplet 801. Once again, such a pressure increase may be achieved by changing the temperature of the fluid within the cells, illustratively in FIG. 8C to a temperature greater than the initial temperature $T_0$. The increased temperature will increase the pressure within the cells above the initial pressure $P_0$. The contact angle between the droplet and the elements of the feature pattern will thus change to $\theta_3$, which is smaller than $\theta_1$ and the liquid will move out of the cells, thus returning droplet 801 to a very low flow resistance contact with feature pattern 804. Once again, one skilled in the art will recognize that any method of increasing the pressure within the cells to reverse the penetration of the droplet 801, including any other method of increasing the temperature of the fluid within the cells, will have similar results.

Figure 9:
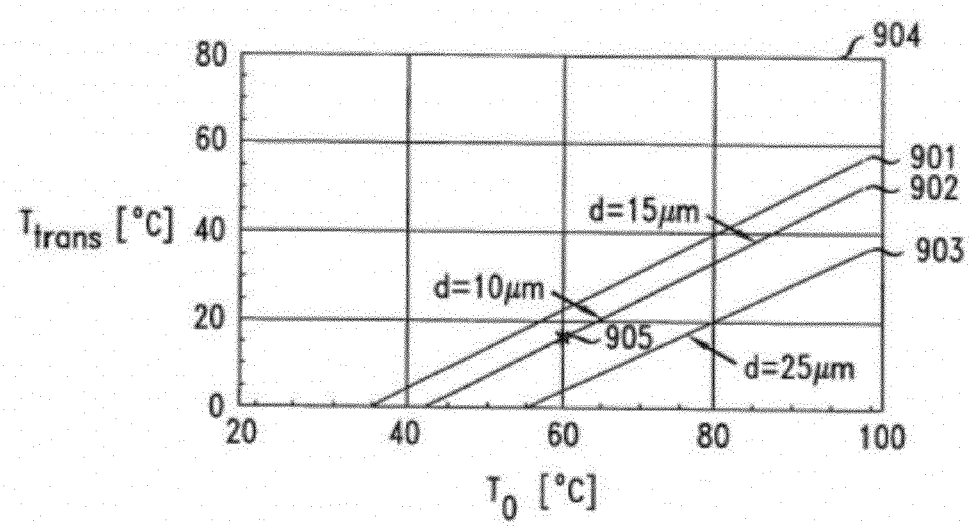
FIG. 9 shows a graph of the temperature of the fluid in a closed cell necessary to achieve a transition from the device in FIG. 5A to the device in FIG. 5B as a function of the initial temperature in that cell and the size d of the cell.

FIG. 9 shows a graph 904 of the temperature ($T_{trans}$) necessary to achieve a 120 degree contact angle of advancement ($\theta_2$ in FIG. 8B) in order to achieve penetration of the droplet into a feature pattern. FIG. 9 assumes a cell height h of 160 microns and a droplet interfacial tension of 62 mN/m. With these conditions, FIG. 9 shows that, for an initial temperature $T_0$ of the fluid within the cells and for a representative width d (represented by plots 901, 902 and 903 and shown in FIGS. 7A and 7B as dimension 702), there is a given temperature ($T_{trans}$) at or below which a droplet will penetrate the feature pattern. For example, If the width of the cell is 15 microns, illustrated by plot 902 on graph 904, and the initial temperature $T_0$ of the fluid in the cells is 60 degrees Celsius, then the pressure will drop sufficiently to cause the droplet to penetrate the feature pattern at or below a transition temperature $T_{trans}$ of approximately 15 degrees Celsius, represented by point 905 on plot 902.

Figure 10:
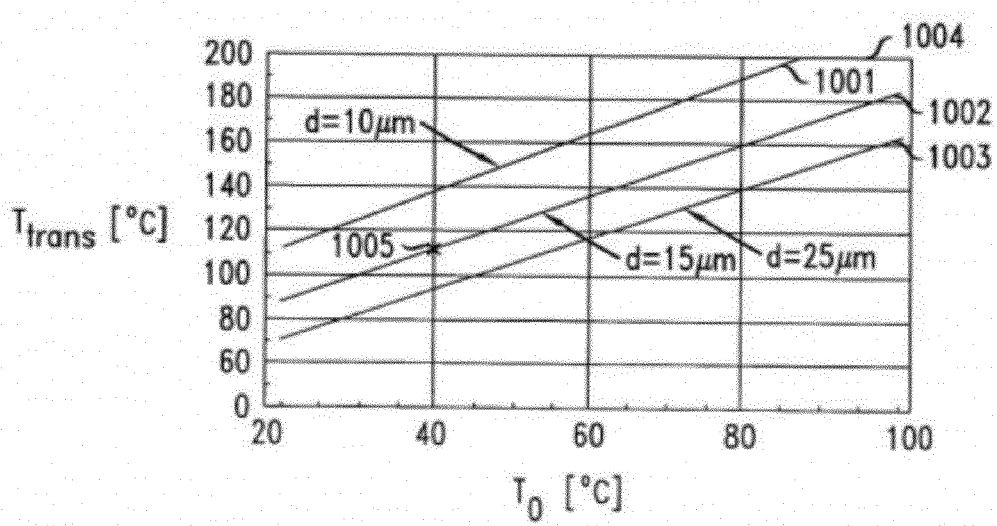
FIG. 10 shows a graph of the temperature of the fluid in a closed cell necessary to achieve a transition from the device in FIG. 5B to the device in FIG. 5C as a function of the initial temperature in that cell and the size d of the cell.

FIG. 10 shows a graph 1004 having plots 1001, 1002 and 1003 representing different cell widths d, discussed above. Once again, the interfacial tension of the droplet is assumed to be 62 mN/m and the cell height h is assumed to be 160 microns. FIG. 10 shows the temperature change necessary to achieve a 0 degree contact angle ($\theta_2$ in FIG. 8B) which is the smallest contact angle theoretically achievable to reverse the penetration of the droplet after it has penetrated the feature pattern. For example, once again for a cell width of 15 microns, represented by plot 1002, for an initial temperature $T_0$ (prior to any penetration of the feature pattern) of 40 degrees Celsius, point 1005 on plot 1002 shows that a transition temperature $T_{trans}$ of approximately 110 degrees Celsius is necessary to increase the pressure within the cells and reverse the contact angle of the droplet to 0 degrees and achieve full reversal of the penetration. One skilled in the art will recognize that different contact angles may be achieved and, in the case of reversing the penetration, lower transition temperatures will generally result in greater contact angles, all else remaining equal. Thus, many different temperatures (lower than $T_0$) may be used to penetrate the liquid into the feature pattern and, similarly, many different temperatures (higher than $T_0$) may be used to reverse that penetration.

Thus, the foregoing discussion illustrates how penetration of a feature pattern may be achieved and how that penetration can be selectively reversed. However, in addition to facilitating penetration reversal, the present inventors have recognized that closed cell feature patterns such as that described above, are useful for other purposes. For example, such feature patterns may function to substantially prevent any penetration of the feature pattern even in the presence of increasing pressure exerted by the droplet onto that feature pattern. Such a function may be desirable on, for example, a submersible vehicle. The use of above-described open-celled nanostructured feature patterns on submersible vehicles is the subject of copending U.S. patent application Ser. No. 10/649, 285, entitled "Method And Apparatus For Reducing Friction Between A Fluid And A Body," filed Aug. 27, 2003, which is hereby incorporated by reference herein in its entirety.

The '285 application discloses how open-celled nanostructure feature patterns, when used on a submersible vehicle such as a submarine or a torpedo, will dramatically reduce the friction (drag) caused by flow resistance of, illustratively, water passing across the surface of the underwater vehicle. However, while such reduced friction is advantageous in many situations, the present inventors have recognized that, when the pressure of the water exceeds a certain threshold (depending upon the characteristics of the feature pattern), the water will penetrate the feature pattern, possibly dramatically increasing the drag on the submersible vehicle. Therefore, the present inventors have further recognized that it is desirable to prevent the water from penetrating the feature pattern even in the presence of relatively high pressure.

Figure 11A:
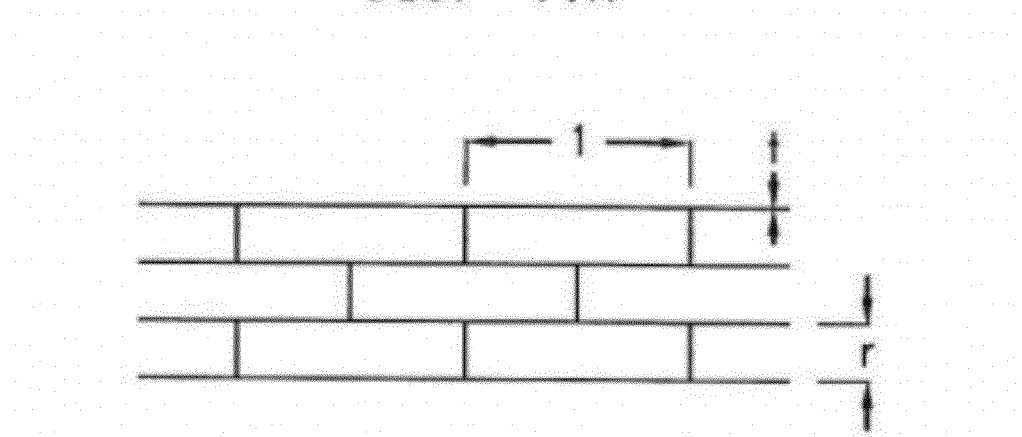
FIGS. 11A and 11B show another embodiment of a closed-cell structure in accordance with the principles of the present invention.
Figure 11B:
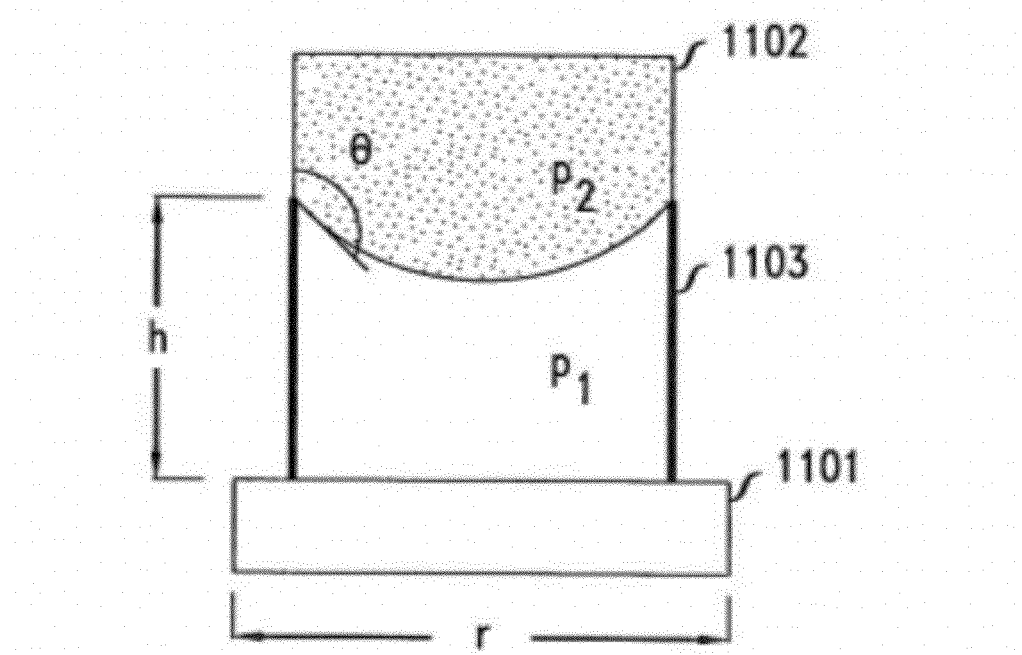

FIGS. 11A and 11B show one illustrative embodiment in accordance with the principles of the present invention whereby liquid is prevented from penetrating a feature pattern even when that liquid is at a relatively high pressure. Referring to FIG. 11A, a top view of a nanostructured or microstructured feature pattern is shown wherein each cell has a rectangular cross section. Each cell has a length l, a wall thickness t and a width r. Referring to FIG. 11B, each cell also has a height h. Illustratively, l=10 micrometers, t=0.3 micrometers, r=4 micrometers and h=0.25 micrometers. Initially, the pressure within each of the cells in FIG. 11A is at an ambient pressure $P_0$. Thus, for example, in the case where the feature pattern of FIGS. 11A and 11B is disposed on the surface of a submarine, when the submarine is traveling on the surface of water at least a portion of the cells will have an initial pressure of the air surrounding the submarine. When the submarine submerges, however, as is illustratively represented by FIG. 11B, the water begins to exert a pressure $P_2$ onto the feature pattern, thus resulting in a contact angle θ between the liquid and the pattern. The resulting increased contact angle will correspondingly increase the pressure of the fluid (e.g., air) within the cell from $P_0$ to $P_1$. As the depth of the submarine increases and the pressure $P_2$ increases, the contact angle θ will increase and, as a result, the pressure $P_1$ within the cell will similarly increase. At a threshold determined by the characteristics of the feature pattern 1103 (e.g., the length, height and width of the cells), the pressure $P_2$ and hence the contact angle θ will become too great and the water 1102 will penetrate the feature pattern 1103 until it contacts substrate 1101. For the feature pattern of FIGS. 11A and 11B, therefore, up to a certain pressure limit there will be a range of pressures (that correspond to depths in water for the illustrative example of a submarine) for which the water will not penetrate the feature pattern. Thus, in the case of the submarine, the submersible vehicle can submerge to a depth much greater without penetration of the feature pattern than would be the case where an open-celled feature pattern of, for example, nanoposts, were used. As a result, low flow resistance can be maintained to a much greater depth that using such an open pattern.

Figure 12:
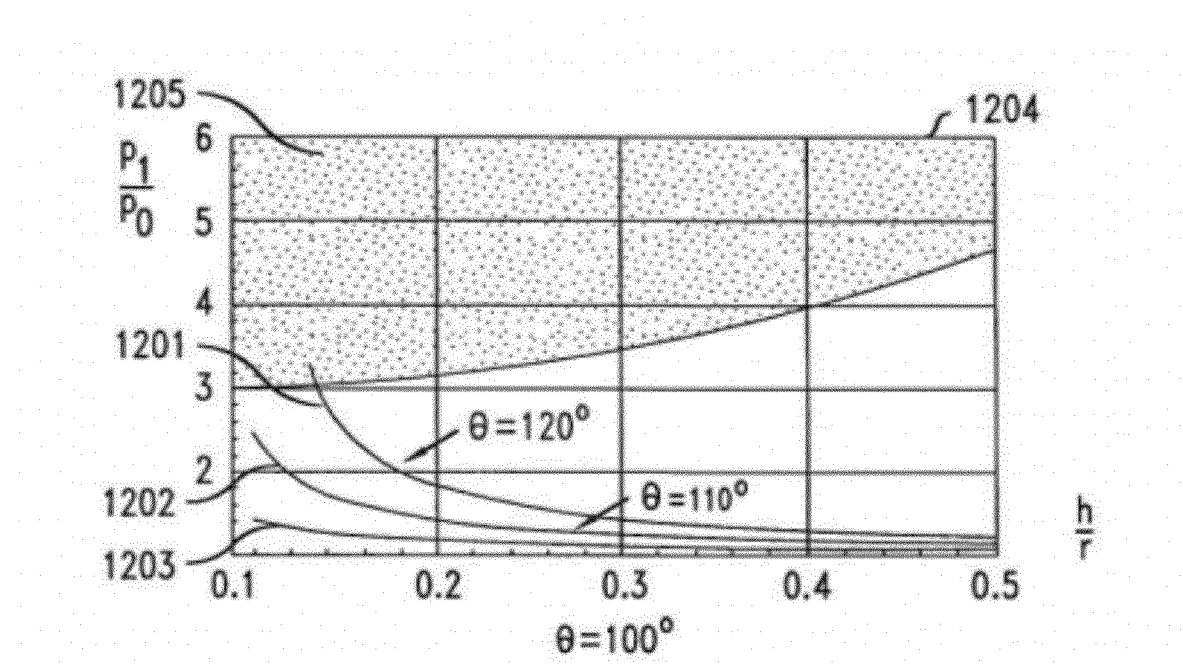
FIG. 12 shows a graph of pressure versus cell dimensions for the embodiment of FIGS. 11A and 11B.

FIG. 12 shows a graph 1204 with plots 1201, 1202 and 1203 that illustrate how different pressures within the cells of the feature pattern of FIGS. 11A and 11B will result in a specific contact angle when the cells are defined by a particular height to width ratio (h/r). For example, plot 1201 shows that, for cells having h/r=0.18, a pressure $P_1$ that is two times the initial pressure $P_0$ will result in a contact angle of 120 degrees. Plots 1202 and 1203 show how changes in the pressure $P_1$ will result in different contact angles for given cell dimensions. One skilled in the art will readily be able to develop different plots for different contact angles other than those shown in FIG. 12.

FIG. 12 also shows that, for pressures and cell dimension combinations that fall within area 1205 of graph 1204, there are no solutions that would lead to an unpenetrated surface of the feature pattern. Thus, for example, for any cell dimensions, a pressure $P_1$ that is 5 times the initial ambient pressure $P_0$, will lead to penetration of the feature pattern. However, since such pressures are routinely experienced by underwater vehicles such as submarines, it is highly desirable to be able to prevent penetration of the feature pattern for significantly greater pressures.

Figure 13A:
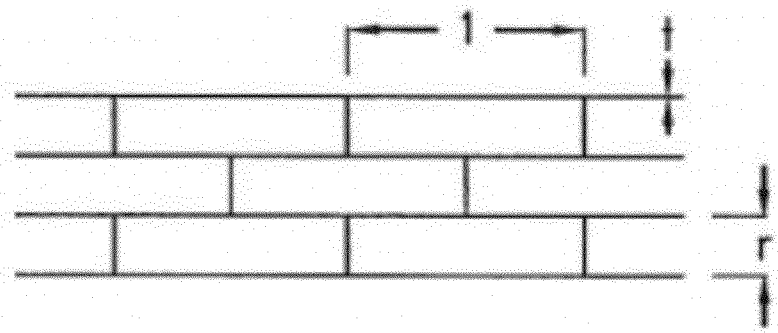
FIGS. 13A and 13B show another embodiment of a closed-cell structure in accordance with the principles of the present invention.
Figure 13B:
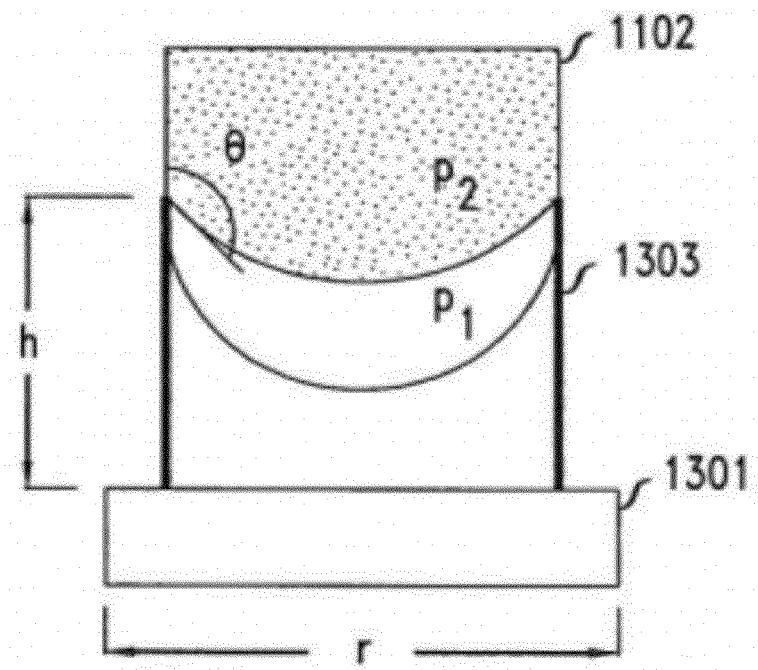

FIGS. 13A and 13B show an illustrative cell configuration that will prevent the penetration of water into the feature pattern at significantly greater pressures. As shown in FIG. 13A the top cross section view of the feature pattern capable of withstanding greater pressures appears to be the same as that in FIG. 11A and, indeed, can have the same length (l=10 micrometers), wall thickness (t=0.3 micrometers) and width (r=4 micrometers) as the embodiment in that figure. Similarly, referring to FIG. 13B, the height of the individual cells is, illustratively, the same as the height h (0.25 microns) of the cells of FIG. 11B. FIG. 13B shows, however, that instead of being rectangular in side cross section, as were the cells in FIG. 11B, the cells of 13B are rounded at the bottom and, thus, each cell is capable of holding less fluid (e.g., air). As a result, when the pressure $P_2$ rises and compresses the fluid within the cell, the pressure $P_1$ rises more quickly than was the case in the embodiment of FIGS. 11A and 11B. Thus, the cell can withstand a much higher pressure of water before the liquid will penetrate the cells of the feature pattern.

FIG. 14 shows a graph 1404 with plots 1401, 1402 and 1403 that illustrate how different pressures within the cells of the feature pattern of FIGS. 13A and 13B will result in a specific contact angle when the cells are defined by a particular height to width ratio (h/r). As can be seen at point 1405, for a height to width ratio of approximately 0.12, a contact angle of approximately 110 degrees will result from a pressure $P_1$ of 5 times the initial ambient pressure $P_0$. Similarly, point 1406 shows that, for a slightly higher cell height to width ratio of 0.18, a contact angle of 120 degrees will result from a pressure $P_1$ of 6 times the initial ambient pressure $P_0$. In fact, a contact angle of 120 degrees is practically limitless with regard to the pressure $P_1$ that can be withstood without penetration of the feature pattern. Accordingly, the low-flow properties of the surface remain intact and, in the case of a submarine, a low friction (drag) will continue to be experienced even at great water pressures/depths.

The foregoing merely illustrates the principles of the invention. It will thus be appreciated that those skilled in the art will be able to devise various arrangements which, although not explicitly described or shown herein, embody the principles of the invention and are within its spirit and scope. Additionally, one skilled in the art, in light of the descriptions of the various embodiments herein, will recognize that the principles of the present invention may be utilized in widely disparate fields and applications. For example, one skilled in the art will recognize that, although not explicitly described hereinabove, other well known methods of producing nanostructures or microstructures, such embossing, stamping, printing, etc., could be used.

All statements herein reciting aspects and embodiments of the invention, as well as specific examples thereof, are intended to encompass functional equivalents thereof. Moreover, all examples and conditional language recited herein are intended expressly to be only for pedagogical purposes to aid the reader in understanding the principles of the invention and are to be construed as being without limitation to such specifically recited examples and conditions. For example, while the description of the above embodiments is limited to discussing a droplet disposed on a nanostructured or microstructured surface, one skilled in the art will readily recognize that the above embodiments are intended to encompass any flow of a liquid across a surface or the movement of a surface through a liquid. Additionally, while pressure variations are discussed as being used to cause a liquid to penetrate a feature pattern, one skilled in the art will recognize that prior methods of causing such penetration, such as causing the surface tension of the droplet to drop, will be equally advantageous. Also, in light of the principles set forth above, one skilled in the art will be able to devise many different applications could benefit from the ability to prevent penetration of a feature pattern or from reversing such a penetration. Finally, penetration of a liquid into a feature pattern and the reversing of that penetration may be accomplished by other means other than increasing or decreasing the temperature of the fluid within closed cells. For example, air may be blown/withdrawn into/from the cells, thus increasing/decreasing, respectively, the pressure within those cells.

What is claimed is:

1. A method for controlling friction on at least a first surface of a substrate, said surface comprising a plurality of cells disposed in a feature pattern, said method comprising:

disposing a liquid in contact with said plurality of cells wherein said feature pattern is a closed cell feature pattern formed by each cell of said plurality of cells being enclosed on all sides except for an open side upon which said liquid is in contact, and said plurality of cells forming a structured surface where each cell of said surface has at least a first dimension of less than one micrometer; and varying the pressure of at least a first fluid in at least one cell in said plurality of cells in a way such that said liquid in contact with said cells will variably enter and exit the cells.

2. The method of claim 1, wherein said pressure is varied by varying the temperature of the fluid within said at least one cell.

3. The method of claim 1, wherein said plurality of cells configure said structured surface as a microstructured surface where each cell of said microstructured surface has at least a first dimension of less than 1 millimeter.

4. The method of claim 1, wherein said plurality of cells configure said structured surface as a nanostructured surface where each cell of said nanostructured surface has at least a first dimension of less than 1 micron.

5. The method of claim 1, wherein said pressure is varied in response to a variation of the pressure of a liquid disposed on said feature pattern.

* * * * *